United States Patent [19]

DeMartino et al.

[11] 4,094,795
[45] June 13, 1978

[54] POLYGALACTOMANNAN ETHER COMPOSITIONS

[75] Inventors: Ronald N. DeMartino, Wayne; Anthony B. Conciatori, Chatham, both of N.J.

[73] Assignee: Celanese Corporation, New York, N.Y.

[21] Appl. No.: 763,372

[22] Filed: Jan. 28, 1977

[51] Int. Cl.² .............................................. E21B 43/25
[52] U.S. Cl. ............................... 252/8.55 R; 252/316; 536/52; 536/114
[58] Field of Search ................... 252/8.55 R; 536/114, 536/52

[56] References Cited

U.S. PATENT DOCUMENTS

| 2,801,218 | 7/1957 | Menaul | 252/8.55 R |
| 3,346,555 | 10/1967 | Nordgren | 536/52 |
| 3,483,121 | 12/1969 | Jordan | 252/8.55 R |
| 3,615,794 | 10/1971 | Nimerick | 252/8.55 R X |
| 3,912,713 | 10/1975 | Boonstra et al. | 536/114 |
| 3,922,173 | 11/1975 | Misak | 252/8.55 R X |
| 3,960,736 | 6/1976 | Free et al. | 252/8.55 R |

*Primary Examiner*—Herbert B. Guynn

[57] ABSTRACT

This invention provides a novel dialkylacrylamide ether adduct of polygalactomannan gum composition. This invention further provides a novel hydraulic fluid composition adapted for fracturing of subterranean formations, which composition contains dialkylacrylamide ether adduct of polygalactomannan gum as a gelling agent.

6 Claims, No Drawings

POLYGALACTOMANNAN ETHER COMPOSITIONS

BACKGROUND OF THE INVENTION

The productivity of oil and gas wells can be improved by increasing the area of communication within a selected producing zone. The drainage area can be increased by hydraulic fracturing of the producing zone to provide fractures and channels emanating from the well base area into the contiguous subterranean formations.

The hydraulic fracturing process is accomplished by rapid pumping of an aqueous fluid medium down a well which penetrates the subterranean formation where fracturing is desired. The rapid pumping of the aqueous fluid creates a hydrostatic pressure which energizes splitting forces in the confined zone. Pressures as high as 10,000 psi are employed to effect formation fracturing.

As cracks and channels are formed, a propping agent which is suspended in the high viscosity hydraulic fluid penetrates the newly created fissures and becomes lodged therein. The function of the propping agent is to support the fractures in an open position as a conduit for the flow of fluids such as oil, gas or water through the fractured zone. Various non-compressible materials are employed as proppants. These include sand, rounded walnut shells, glass beads, aluminum spheres, and the like. U.S. Pat. No. 3,708,560 proposes polyester resin prills as a proppant in hydraulic fracturing fluid systems.

After a fracturing operation has been completed and the propping agent has been deposited, the hydrostatic pressure is released, the flow of fluid is reversed, and the hydraulic fracturing fluid is withdrawn.

Hence, the hydraulic fracturing fluid composition functions to force fracturing under hydrostatic pressure, and it serves to transport the suspension of propping agent into the porous subterranean formations. The hydraulic well-treating fluid medium must exhibit advantageous viscosity and particulate solids transport properties.

Hydraulic fracturing fluids commonly employ a viscosity increasing agent such as a water-soluble polymer to improve the flow characteristics and the suspending ability of the fluids. Carboxymethylcellulose, polyacrylamide, polyvinylpyrrolidone, guar, tragacanth, Irish moss, modified starch, and the like, have been employed as water-soluble or water-dispersible additives to provide pumpable gels having solids suspending properties. U.S. Pat. Nos. 3,483,121; 3,757,864; 3,779,914; 3,818,998; 3,900,069; 3,971,440; and references cited therein, describe hydraulic well-treating compositions which contain novel polymeric friction-reducing gelling components.

Hydraulic fracturing fluids which contain a natural gum, such as unmodified polygalactomannan gum, commonly include a breaker additive to effect a delayed action thinning out of the fluid medium. This facilitates the subsequent removal of the hydraulic fracturing fluid composition from the fractured formation.

Breaker additives include enzymes which under the well-fracturing conditions in a delayed manner autonomously reduce the hydraulic fluid viscosity by degrading the natural gum incorporated as a gelling agent. U.S. Pat. Nos. 2,681,704; 2,801,218; 3,615,794; 3,684,710; and references cited therein, describe new enzyme compositions, such as mannan depolymerase which is derived from a microbiologic source.

The disadvantage of employing natural gum as a gelling agent in hydraulic fracturing fluids is the lessening of fluid loss control caused by plugging of apertures which reduces the permeability of a fractured formation. In the case where a natural resin such as guar gum is employed as a gelling agent in combination with an enzyme breaker additive in a hydraulic fracturing fluid, the hydraulic system is unsatisfactory because the hydrolysis residue of the natural gum is present in sufficient quantity to create a plugging effect and reduces the permeability of a fractured formation.

Accordingly, it is a main object of the present invention to provide novel natural gum derivatives having improved viscosity and suspending properties for application as gelling agents in hydraulic well-treating fluid compositions.

It is another object of this invention to provide hydraulic well-treating fluid compositions containing a natural gum derivative in combination with breaker additive.

It is another object of this invention to provide hydraulic well-fracturing fluid compositions containing a polygalactomannan ether derivative in combination with an enzyme as a breaker additive, which are characterized by a low yield of hydrolysis residue.

It is a further object of this invention to provide a novel ether adduct derivative of polygalactomannan gum which has superior properties for application as a dispersing agent or a textile print gum.

Other objects and advantages of the present invention shall become apparent from the accompanying description and examples.

DESCRIPTION OF THE INVENTION

Polygalactomannan gums are hydrocolloid polysaccharides composed principally of galactose and mannose units and are usually found in the endosperm of leguminous seeds, such as guar, locust bean, honey locust, flame tree, and the like. Guar flour, for example, is composed mostly of a galactomannan which is essentially a straight chain mannan with single-membered galactose branches. The mannose units are linked in a 1-4-$\beta$-glycosidic linkage and the galactose branching takes place by means of a 1-6 linkage on alternate mannose units. The ratio of galactose to mannose in the guar polymer is, therefore, one to two. Guar gum has a molecular weight of about 220,000.

Locust bean gum is also a polygalactomannan gum of similar molecular structure in which the ratio of galactose to mannose is one to four. Guar and locust bean gum are the preferred sources of the polygalactomannans, principally because of the commercial availability thereof.

Polygalactomannan gums swell readily in cold water and can be dissolved in hot water to yield solutions which characteristically have a high viscosity even at a concentration of 1–1.5 percent. Guar gum and locust bean gum as supplied commercially usually have a viscosity (at 1% concentration) of around 1000 to 4000 centipoises at 25° C using a Brookfield Viscometer Model LVF, spindle No. 2 at 6 rpm.

For the purposes of the present invention, one or more objects are accomplished by the provision of a novel N,N-dialkylacrylamide ether adduct of polygalactomannan gum. As employed herein, the term "N,N- dialkylacrylamide" is meant to include N,N-dialkylmethacrylamide.

Illustrative of a preferred class of polygalactomannan ether adduct gum is one represented by the formula:

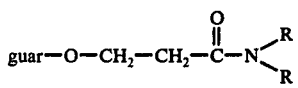

wherein R is an alkyl group containing between one and about four carbon atoms.

The N,N-dialkylacrylamide ether adduct of polygalactomannan gum is produced by contacting natural polygalactomannan gum with N,N-dialkylacrylamide (or N,N-dialkylmethacrylamide) in the presence of a basic compound. The etherification reaction proceeds readily at a temperature between about 0° C and 100° C.

The N,N-dialkylacrylamide reactant is employed in a quantity sufficient to provide the desired degree of substitution of hydroxyl groups with oxypropionamido groups, e.g., a degree of substitution (D.S.) between about 0.01 and 3.0, and preferably between about 0.1 and 1.5.

By the term "degree of substitution" as employed herein is meant the average substitution of ether groups per anhydro sugar unit in the polygalactomannan gums. On the average, each of the anhydro sugar units contains three available hydroxyl sites.

The basic compound is employed in a quantity sufficient to provide an alkaline reaction medium having a pH between about 7.5 and 12. Suitable basic compounds include inorganic and organic derivatives such as alkali metal and alkaline earth metal hydroxides, quaternary ammonium hydroxides, alkoxides, organic acid salts, and the like. Illustrative of basic compounds are sodium hydroxide, potassium hydroxide, calcium hydroxide, barium hydroxide, sodium carbonate, potassium acetate, sodium methoxide, tetramethylammonium hydroxide, and the like.

In conducting the etherification reaction, it is advantageous to form a slurry of the polygalactomannan gum in an aqueous alkanone medium and effect the reaction without completely hydrating the said gum reactant. This facilitates recovery of the etherified polygalactomannan gum product. After neutralization of any excess basic compound in the reaction medium, the solid gum product is readily recovered by filtration. Methods of preparing ether adducts of saccaridic compounds are disclosed in U.S. Pat. Nos. 2,928,827; 3,101,330; 3,346,555; 3,823,100; and references cited therein.

One or more other objects of the present invention are accomplished by the provision of a hydraulic well-treating fluid composition which comprises an aqueous solution containing N,N-dialkylacrylamide ether adduct of polygalactomannan gum as a gelling agent, and a breaker additive for reduction of solution viscosity. The preferred hydraulic fluid compositions additionally contain a propping agent such as sand or comminuted walnut shells.

The breaker additive is preferably an enzyme which under formation fracturing conditions autonomously degrades the polygalactomannan ether gum adduct gelling agent so as to reduce the viscosity of hydraulic fluid which is under hydrostatic pressure. Although the effect of the enzyme breaker additive commences immediately upon intimate admixture of the polygalactomannan ether adduct gum and the breaker additive, the time required to reduce the solution viscosity by 50 percent can range over a period between about one half hour and two hours. The rate of polygalactomannan ether adduct gum degradation is affected by pH, temperature, and salt content of the hydraulic fluid system.

The enzyme breaker additive can be employed in a quantity between about 0.01 and 5 weight percent, based on the weight of polygalactomannan ether adduct gum in a hydraulic fluid composition. Hemicellulase enzyme is illustrative of a suitable breaker additive for hydraulic fluid compositions containing polygalactomannan ether adduct gum.

The quantity of the said N,N-dialkylacrylamide ether adduct of polygalactomannan gum incorporated in an invention hydraulic composition can vary in the range between about 0.05 and 5 weight percent based on the weight of the water component. A preferred range is between about 0.1 and 2 weight percent of gum, based on the weight of water.

The present invention hydraulic fluid compositions consisting essentially of (1) an aqueous medium, (2) N,N-dialkylacrylamide ether adduct of polygalactomannan gum, (3) an enzyme breaker additive, and (4) a propping agent, are eminently suitable for application as well-fracturing fluid media.

The hydraulic fluid compositions of the present invention exhibit excellent solution stability and heat stability in comparison with the corresponding hydraulic fluid compositions containing unmodified polygalactomannan gum as a gelling agent. The invention hydraulic fluid compositions have superior ability to hydrate and develop high viscosity in the presence of salts. Further, an enzyme breaker additive can hydrolyze the polygalactomannan ether adduct gum at a convenient rate and with a resultant low yield of hydrolysis residue, e.g., a yield of less than about 2 weight percent residue, based on the original weight of polygalactomannan ether adduct gum gelling agent.

It was also found that the N,N-dialkylacrylamide ether adduct of polygalactomannan gum provided by the present invention has superior properties in comparison with the corresponding acrylamide ether adduct polygalactomannan gum. Particularly significant for the purposes of the present invention is the greater resistance to hydrolysis exhibited by the N,N-dialkylacrylamide moiety as compared with the corresponding acrylamide moiety of the gum derivatives. Acrylamide tends to hydrolyze to carboxylic acid under the etherification reaction conditions:

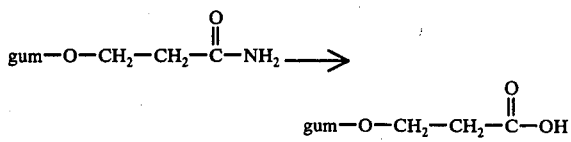

The presence of carboxylic acid groups in the gum derivatives is detrimental in the applications completed by the present invention.

The following examples are further illustrative of the present invention. The reactants and other specific ingredients are presented as being typical, and various modifications can be derived in view of the foregoing disclosure within the scope of the invention.

EXAMPLE 1

Preparation Of Dimethylacrylamide Adducts of Polygalactomannan Gum

The formulations listed in Table 1 are reacted in the following manner.

The galactomannan gum is slurried in the acetone solution, then heated to 40° C and purged for one hour with nitrogen. The caustic solution is added to the slurry, and the mixture is stirred for 10 minutes.

The N,N-dimethylacrylamide reactant is added to the mixture, and the etherification reaction is conducted at 40° C over a period of four hours. The reaction mixture is neutralized with acetic acid, then filtered, washed twice with 50% acetone, and once with 100% acetone. The polygalactomannan ether adduct product is recovered and air-dried.

In comparison with the corresponding unmodified natural polygalactomannan gum starting materials, the N,N-dimethylacrylamide ether adduct derivatives hydrate faster and reach peak viscosity more quickly. Also, the higher the degree of substitution of N,N-dimethylacrylamido groups in the polygalactomannan ether adduct derivatives, the greater the stability under varying conditions of pH and temperature. The polygalactomannan ether adduct derivatives of the present invention have the further advantages of improved solution stability and resistance to bacterial degradation.

TABLE I

| Formulation Reference | A | A' | B | B' | C | C' |
|---|---|---|---|---|---|---|
| 50% Acetone | 1800 mls | 1800 mls | 1800 mls | 1800 mls | 1800 mls | 1800 mls |
| Guar gum | 300 grams | — | 300 grams | — | 300 grams | — |
| Locust bean gum | — | 300 grams | — | 300 grams | — | 300 grams |
| 50% Sodium hydroxide | 30 grams | 30 grams | 30 grams | 30 grams | 30 grams | 30 grams |
| N,N-dimethylacrylamide | 75 grams | 75 grams | 150 grams | 150 grams | 300 grams | 300 grams |
| Approximate D.S. | 0.11 | 0.11 | 0.25 | 0.25 | 0.5 | 0.5 |

The polygalactomannan ether adduct derivatives also exhibit greater stability in alcohol solution than the corresponding unmodified natural gum.

| N,N-Dimethylacrylamide adduct of guar | 1% Solution | |
|---|---|---|
| | 50% Methanol | 75% Methanol |
| D.S., 0.11 | 5000 CPS | 0 |
| D.S., 0.25 | 3700 | 1200 |
| D.S., 0.5 | 3100 | 2500 |
| Guar | 0 | 0 |

N,N-Dimethylacrylamide ether adduct of guar gum (D.S. of 0.26) exhibits long term aqueous solution stability in comparison with guar gum. For example, a 5250 CPS ether adduct viscosity (1% solution) remains substantially unchanged over a period of 20 days. Unmodified guar gum (1% solution, 5000 CPS) loses measurable viscosity within 2–3 days.

EXAMPLE II

Dispersive Properties Of Polygalactomannan Ether Adducts

Commercial guar gum is dissolved in water to produce a 0.48% aqueous solution (100 mls). In the same manner, a 0.48% solution is prepared with N,N-dimethylacrylamide ether adduct of guar gum in accordance with Formulation A in EXAMPLE I.

To each of the 0.48% solutions is added 50 mls of a 6% clay slurry. After one half hour, flocculation of clay is evident and there is settling of clay in the slurry mixture which contains regular guar gum. In the slurry mixture containing the present invention ether adduct of guar gum, no flocculation of clay is evident, and there is essentially no settling of clay under the test conditions.

These test results demonstrate that N,N-dialkylacrylamide ether adduct of polygalactomannan gum is an effective dispersant for clay slurries, while commercial polygalactomannan gum is not.

EXAMPLE III

Oil Well Fracturing, Insoluble Residue Test

N,N-Dimethylacrylamide ether adducts of guar gum produced in accordance with Formulations A, B and C hereinabove are each dissolved in 400 mls of water to form a 0.5% aqueous solution. To each solution is added 0.01% by weight of hemicellulase enzyme, and the solution is aged overnight at 30° C, and then centrifuged. Supernatant liquid is decanted, and insoluble residue is recovered. The residue is slurried with water, then the residue is separated from the liquid, dried and weighed.

In the same manner a commercial guar gum is subjected to enzyme treatment, and residual solid is recovered and weighed for comparison purposes.

| Formulation | %, Insoluble residue |
|---|---|
| A | 1.3 |
| B | 0.4 |
| C | 0.2 |
| Guar | 10.8 |

This comparison demonstrates that an invention N,N-dialkylacrylamide ether adduct of polygalactomannan gum is better adapted than commercial polygalactomannan gum for application as a gelling agent in oil well fracturing compositions. An invention polygalactomannan ether adduct derivative is superior to unmodified guar gum because under oil well fracturing conditions it is more heat stable and it leaves much less clogging residue after enzyme treatment.

What is claimed is:

1. A hydraulic well-treating fluid composition which comprises an aqueous solution containing N,N-dialkylacrylamide ether adduct of polygalactomannan gum as a gelling agent in an amount in the range between about 0.05 and 5 weight percent based on the weight of the water component, wherein each alkyl group contains between one and about four carbon atoms; and a breaker additive for reduction of solution viscosity.

2. A hydraulic well-fracturing fluid composition comprising (1) an aqueous medium, (2) N,N-dialkylacrylamide ether adduct of polygalactomannan gum as a gelling agent in an amount in the range between about 0.05 and 5 weight percent based on the weight of the water component wherein each alkyl group contains between one and about four carbon atoms, (3) a breaker additive for subsequent autonomous reduction of the gelling properties of the N,N-dialkylacrylamide ether adduct of polygalactomannan gum, and (4) a propping agent.

3. A hydraulic well-fracturing fluid composition in accordance with claim 2 wherein the gelling agent is N,N-dimethylacrylamide ether adduct of guar gum.

4. A hydraulic well-fracturing fluid composition in accordance with claim 2 wherein the gelling agent is N,N-dimethylacrylamide ether adduct of locust bean gum.

5. A hydraulic well-fracturing fluid composition in accordance with claim 2 wherein the breaker additive is hemicellulase enzyme.

6. A hydraulic well-fracturing fluid composition in accordance with claim 2 wherein the propping agent is sand.

* * * * *